United States Patent
Zhang

(10) Patent No.: US 11,937,242 B2
(45) Date of Patent: Mar. 19, 2024

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/139,047

(22) Filed: Dec. 31, 2020

(65) Prior Publication Data

US 2021/0127395 A1 Apr. 29, 2021

Related U.S. Application Data

(63) Continuation of application No. 16/692,288, filed on Nov. 22, 2019, now Pat. No. 10,925,060, which is a
(Continued)

(51) Int. Cl.
*H04W 72/21* (2023.01)
*H04L 5/00* (2006.01)
(Continued)

(52) U.S. Cl.
CPC ............ *H04W 72/21* (2023.01); *H04L 5/005* (2013.01); *H04W 72/0453* (2013.01); *H04W 72/23* (2023.01); *H04L 27/2602* (2013.01)

(58) Field of Classification Search
CPC ....... H04L 5/001; H04L 5/005; H04L 5/0053; H04L 27/2602; H04W 56/00;
(Continued)

(56) References Cited

U.S. PATENT DOCUMENTS 9,198,070 B2 * 11/2015 Krishnamurthy ..... H04L 5/0053
9,961,681 B2 5/2018 Xue et al.
(Continued)

FOREIGN PATENT DOCUMENTS

AU 2018261818 A1 * 11/2019 ......... H04L 27/2602
BR 112019022878 A2 * 5/2020 ......... H04L 27/2602
(Continued)

OTHER PUBLICATIONS

CIPO, Office Action for CA Patent Application No. 3,064,971, dated Nov. 24, 2021.
(Continued)

*Primary Examiner* — Eric Nowlin
(74) *Attorney, Agent, or Firm* — Hodgson Russ LLP

(57) ABSTRACT

Provided is a wireless communication method and device. Frequency-domain resource allocation and/or bandwidth part configuration is flexibly performed on a terminal device in conjunction with a synchronous signal block, and the performance of a communication system can be raised. The method comprises: a network device receiving a first message sent by a terminal device, the first message being used for indicating a first synchronous signal block detected by the terminal device; and according to the first synchronous signal block, the network device performing frequency-domain resource allocation and/or bandwidth part configuration on the terminal device.

24 Claims, 6 Drawing Sheets

Related U.S. Application Data continuation of application No. PCT/CN2017/088792, filed on Jun. 16, 2017.

(51) Int. Cl.
  *H04L 27/26* (2006.01)
  *H04W 72/0453* (2023.01)
  *H04W 72/23* (2023.01)

(58) Field of Classification Search
  CPC . H04W 56/001; H04W 72/04; H04W 72/042; H04W 72/0413; H04W 72/0453; H04W 74/002; H04W 74/0833
  See application file for complete search history.

(56) References Cited

U.S. PATENT DOCUMENTS

| | | | |
|---|---|---|---|
| 10,925,060 | B2 | 2/2021 | Zhang |
| 11,089,594 | B2 * | 8/2021 | Li ............... H04W 76/27 |
| 11,184,139 | B2 * | 11/2021 | Li ............... H04L 5/0094 |
| 11,337,170 | B2 * | 5/2022 | Song ............ H04L 5/00 |
| 2016/0338056 | A1 | 11/2016 | Xue et al. |
| 2016/0353444 | A1 | 12/2016 | Popovic et al. |
| 2020/0021420 | A1 * | 1/2020 | Li ............... H04W 72/04 |
| 2020/0084773 | A1 * | 3/2020 | Li ............... H04W 56/001 |
| 2020/0236638 | A1 * | 7/2020 | Song ............ H04W 56/00 |
| 2022/0173851 | A1 * | 6/2022 | Shi ............... H04W 72/53 |

FOREIGN PATENT DOCUMENTS

| | | | | |
|---|---|---|---|---|
| CN | 101374016 | | 2/2009 | |
| CN | 108633059 A | * | 10/2018 | ........... H04L 5/0007 |
| CN | 108811123 A | * | 11/2018 | ......... H04L 27/2602 |
| CN | 108990161 A | * | 12/2018 | ......... H04L 27/2602 |
| CN | 108990161 B | * | 3/2020 | ......... H04L 27/2602 |
| CN | 112399590 A | * | 2/2021 | ........... H04L 5/0037 |
| CN | 111491379 B | * | 5/2021 | ......... H04L 27/2602 |
| CN | 108633059 B | * | 6/2021 | ........... H04L 5/0007 |
| CN | 108811123 B | * | 5/2022 | ......... H04L 27/2602 |
| EP | 3585118 A1 | * | 12/2019 | ........... H04L 5/0007 |
| EP | 3611983 A1 | * | 2/2020 | ......... H04L 27/2602 |
| EP | 3585118 A4 | * | 3/2020 | ........... H04L 5/0007 |
| EP | 3611983 B1 | * | 2/2022 | ......... H04L 27/2602 |
| EP | 4017175 A1 | * | 6/2022 | ........... H04L 5/0037 |
| EP | 4017175 A4 | * | 11/2022 | ........... H04L 5/0037 |
| ES | 2910161 T3 | * | 5/2022 | ......... H04L 27/2602 |
| JP | 2017504237 A | * | 2/2017 | |
| JP | 6324509 B2 | * | 5/2018 | ........... H04L 5/0005 |
| JP | 2020502867 | | 1/2020 | |
| JP | 2020519167 A | * | 6/2020 | ......... H04L 27/2602 |
| JP | 6949140 B2 | * | 10/2021 | ......... H04L 27/2602 |
| KR | 20190141186 A | * | 12/2019 | ......... H04L 27/2602 |
| KR | 102287734 B1 | * | 8/2021 | ......... H04L 27/2602 |
| RU | 2019139252 A | * | 6/2021 | ......... H04L 27/2602 |
| RU | 2764150 C2 | * | 1/2022 | ......... H04L 27/2602 |
| WO | 2011088403 A1 | | 7/2011 | |
| WO | 2013140044 A1 | | 9/2013 | |
| WO | WO-2015078177 A1 | * | 6/2015 | ........... H04L 5/0005 |
| WO | WO-2018177223 A1 | * | 10/2018 | ........... H04L 5/0007 |
| WO | WO-2018202001 A1 | * | 11/2018 | ......... H04L 27/2602 |
| WO | WO-2019070101 A1 | * | 4/2019 | ............... H04L 5/00 |
| WO | WO-2021032028 A1 | * | 2/2021 | ........... H04L 5/0037 |

OTHER PUBLICATIONS

JPO, Decision of Refusal for JP Patent Application No. 2019-569709, dated Dec. 8, 2021.
KIPO, Grant of Patent for KR Application No. 10-2019-7038298, dated Nov. 12, 2021.
IPIN, Office Action for IN Application No. 201917048132, dated Mar. 15, 2021.
JPO, Office Action for JP Application No. 2019-569709, dated Mar. 23, 2021.
Huawei et al., "On bandwidth part and bandwidth adaptation," 3GPP TSG RAN WG1 Meeting #89, R1-1706900, May 15, 2017.
Intel Corp., "Bandwidth parts configuration and operations," 3GPP TSG RAN WG1 Meeting #89, R1-1707420, May 15, 2017.
Israel Patent Office, Office Action issued in IL Application No. 270790, dated Mar. 9, 2022.
India Patent Office, Examination Report issued in IN Application No. 202118027993, dated Apr. 5, 2022.
KPO, Office Action issued in KR Application No. 10-2022-7004755, dated Apr. 20, 2022.
EPO, Office Action issued in EP Application No. 17913265.9, dated May 25, 2022.
Indonesia Patent Office, Office Action issued in ID Application No. P-00202000125, dated May 25, 2022.
INAPI, Office Action for CL Application No. 201903615, dated Jul. 19, 2021.
EPO, Communication for EP Application No. 17913265.9, dated Apr. 30, 2021.
KIPO, Office Action for KR Application No. 10-2019-7038298, dated May 25, 2021.
Guangdong OPPO Mobile Telecom, "On Bandwidth Part Configuration," 3GPP TSG RAN WG1 Meeting #89, RI-1707719, May 2017.
ITL, "NR-PBCH Design Aspects," 3GPP TSG RAN WG1 Meeting #89, R1-1708328, May 2017.
Panasonic, "On Default Bandwidth Part," 3GPP TSG RAN NR Ad-Hoc#2, R1-1710787, Jun. 2017.
JPO, Reconsideration Report by Examiner before Appeal for JP Application No. 2019-569709, dated Jun. 28, 2022.
EPO, Extended European Search Report for EP Application No. 22165529.3, dated Jul. 19, 2022.
CIPO, Canadian Office Action for CA Application No. 3,064,971, dated Sep. 29, 2022.
IP Australia, Australian Office Action for AU Application No. 2017418045, dated Oct. 6, 2022.
EPO, Summons for EP Application No. 17913265.9, Dec. 20, 2022.
KIPO, Office Action for KR Application No. 10-2022-7046447, dated Mar. 16, 2023.
NOIP, Office Action for VN Application No. 1-2019-06662, dated Mar. 8, 2023.
IMPI, Office Action for MX Application No. MX/a/2019/015130, dated Jan. 16, 2023.
EPO, Oral Proceedings for EP Application No. 17913265.9, May 19, 2023.
JPO, Office Action for JP Application No. 2022-052571, dated May 30, 2023.
IPOS, Office Action for SG Application No. 10202201970V, dated May 23, 2023.
IMPI, Office Action for MX Application No. MX/a/2019/015130, dated Jun. 7, 2023.
EPO, Communication for EP Application No. 17913265.9, dated Jun. 21, 2023.
ISDEC, Notice of Allowance for CA Application No. 3,064,971, dated Jul. 14, 2023.
EPO, Extended European Search Report for EP Application No. 23164812.2, dated Jun. 15, 2023.
KIPO, Notice of Allowance for KR Application No. 10-2022-7046447, dated Sep. 25, 2023.
IPI, Hearing Notice for IN Application No. 20197048132, dated Sep. 22, 2023.
USPTO, Office Action for U.S. Appl. No. 18/302,102, dated Nov. 7, 2023.
JPO, Decision of refusal for JP Application No. 2022-052571, dated Nov. 17, 2023.
IMPI, Granting Proceeds for MX Application No. MX/a/2019/015130, dated Oct. 9, 2023.
MYIPO, Office Action for MY Appl. No. PI2019006942, dated Jan. 24, 2024.

* cited by examiner

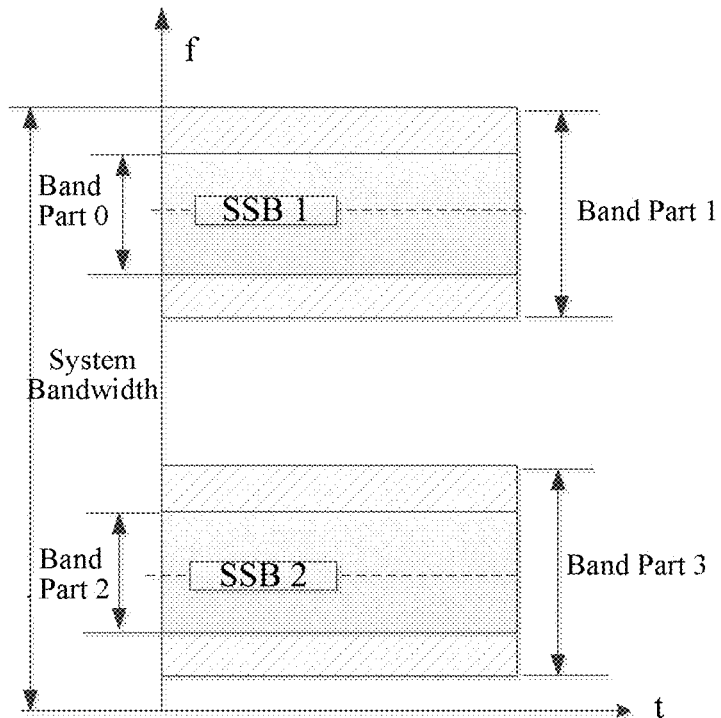

The network device sends first information, where the first information indicates a reference point for the network device to perform frequency-domain resource allocation and/or band part configuration on the terminal device — 310

According to the reference point, the network device performs frequency-domain resource allocation and/or band part configuration on the terminal device — 320

The network device sends the first information, where the first information indicates a first reference point for the network device to send a reference signal to a first terminal device
— 410

According to the reference point, the network device performs frequency-domain resource allocation and/or band part configuration on the terminal device
— 420

WIRELESS COMMUNICATION METHOD AND DEVICE

CROSS-REFERENCE TO RELATED APPLICATION

This application is a continuation of U.S. application Ser. No. 16/692,288, filed Nov. 22, 2019, which is a continuation of International Application No. PCT/CN2017/088792, filed Jun. 16, 2017, the entire disclosures of which are incorporated herein by reference.

TECHNICAL FIELD

The present disclosure relates to the field of communication, and in particular to a wireless communication method and a wireless communication device.

BACKGROUND

In a Long Term Evolution (LTE) communication system, a center frequency of a system bandwidth can be used as a reference point, combined with a data volume transmitted to and from a terminal device, for allocating a resource for the terminal device. In addition, the center frequency of the system bandwidth can also be used as a reference point for sending a reference signal.

However, in a New Radio (NR) communication system, how to allocate and/or configure a resource or send a reference signal is an urgent problem desired to be solved.

SUMMARY

The present application provides a wireless communication method and a wireless communication device, which can be implemented in an NR system, for allocation and/or configuration of a resource, or transmission of a reference signal.

In a first aspect, there is provided a wireless communication method, including: receiving, by a network device, a first message sent by a terminal device, where the first message indicates a first synchronization signal block detected by the terminal device; and performing, by the network device, frequency domain resource allocation and/or band part configuration on the terminal device according to the first synchronization signal block.

Accordingly, in the embodiment of the present disclosure, the network device can, referring to the synchronization signal block currently detected by the terminal device, perform frequency domain resource allocation and/or bandwidth part configuration on the terminal device, which can implement flexible frequency domain resource allocation and/or band part configuration.

Based on the first aspect, in a possible implementation of the first aspect, performing, by the network device, frequency domain resource allocation and/or band part configuration on the terminal device according to the first synchronization signal block, includes: performing, by the network device, frequency domain resource allocation and/or band part configuration on the terminal device according to a frequency point occupied by the first synchronization signal block.

Based on the first aspect or a possible implementation of the first aspect, in another possible implementation of the first aspect, performing, by the network device, frequency domain resource allocation and/or band part configuration on the terminal device according to a frequency point occupied by the first synchronization signal block, includes: determining a reference point according to the frequency point occupied by the first synchronization signal block; and performing, by the network device, frequency domain resource allocation and/or band part configuration on the terminal device according to the reference point.

Based on the first aspect or a possible implementation of the first aspect, in another possible implementation of the first aspect, the method further includes: sending, by the network device, first information to the terminal device, where the first information indicates a reference point for the network device to perform frequency domain resource allocation and/or band part configuration on the terminal device.

Based on the first aspect or a possible implementation of the first aspect, in another possible implementation of the first aspect, the first information is carried in a random access response message or in a radio resource control RRC dedicated signaling.

Based on the first aspect or a possible implementation of the first aspect, in another possible implementation of the first aspect, determining a reference point according to the frequency point occupied by the first synchronization signal block includes: determining a frequency point occupied by the first synchronization signal block as the reference point.

Based on the first aspect or a possible implementation of the first aspect, in another possible implementation of the first aspect, determining a reference point according to the frequency point occupied by the first synchronization signal block includes: determining a second synchronization signal block according to the frequency point occupied by the first synchronization signal block; and determining the reference point according to a frequency point occupied by the second synchronization signal block.

Based on the first aspect or a possible implementation of the first aspect, in another possible implementation of the first aspect, determining the reference point according to a frequency point occupied by the second synchronization signal block includes: determining the frequency point occupied by the second synchronization signal block as the reference point.

Based on the first aspect or a possible implementation of the first aspect, in another possible implementation of the first aspect, the method further includes: sending, by the network device, second information, where the second information indicates a frequency domain relationship between the plurality of synchronization signal blocks, and the plurality of synchronization signal blocks include a first synchronization signal block and the second synchronization signal block.

Based on the first aspect or a possible implementation of the first aspect, in another possible implementation of the first aspect, determining a second synchronization signal block according to the frequency point occupied by the first synchronization signal block includes: determining the second synchronization signal block when a distance between the frequency point occupied by the first synchronization signal block and the frequency domain resource to be allocated to the terminal device is greater than or equal to a predetermined value.

Based on the first aspect or a possible implementation of the first aspect, in another possible implementation of the first aspect, a reference point for the network device to perform band part configuration on the terminal device is a first reference point, and a reference point for the network device to perform resource allocation on the terminal device is a second reference point.

Based on the first aspect or a possible implementation of the first aspect, in another possible implementation of the first aspect, the second reference point is a frequency point occupied by a synchronization signal block closest to the configured band part.

Based on the first aspect or a possible implementation of the first aspect, in another possible implementation of the first aspect, the first reference point is a frequency point occupied by the first synchronization signal block.

Based on the first aspect or a possible implementation of the first aspect, in another possible implementation of the first aspect, the first reference point is a frequency point occupied by the second synchronization signal block.

Based on the first aspect or a possible implementation of the first aspect, in another possible implementation of the first aspect, the first reference point and the second reference point are the same reference point; or, the first reference point and the second reference point are different reference points.

Based on the first aspect or a possible implementation of the first aspect, in another possible implementation of the first aspect, performing, by the network device, frequency domain resource allocation and/or band part configuration on the terminal device according to the reference point, includes: sending, by the network device, third information to the terminal device. The third information indicates: a size of allocated resources and/or an offset from the reference point, and/or a number of configured band parts and/or an offset from the reference point.

Based on the first aspect or a possible implementation of the first aspect, in another possible implementation of the first aspect, the method further includes: sending, by the network device, a reference signal to the terminal device according to a third reference point.

Based on the first aspect or a possible implementation of the first aspect, in another possible implementation of the first aspect, the method further includes: sending, by the network device, fourth information to the terminal device, where the fourth information indicates the third reference point for sending the reference signal to the terminal device.

Based on the first aspect or a possible implementation of the first aspect, in another possible implementation of the first aspect, the first message carries an index of the first synchronization signal block.

Based on the first aspect or a possible implementation of the first aspect, in another possible implementation of the first aspect, the first message indicates the first synchronization signal block to the network device through the occupied resource.

Based on the first aspect or a possible implementation of the first aspect, in another possible implementation of the first aspect, the method further includes: sending, by the network device, fifth information to the terminal device, where the fifth information indicates a correspondence between resources occupied by a plurality of first messages and a plurality of synchronization signal blocks.

Based on the first aspect or a possible implementation of the first aspect, in another possible implementation of the first aspect, the first message is a message in a random access procedure.

Based on the first aspect or a possible implementation of the first aspect, in another possible implementation of the first aspect, the first message is a random access request message, and the first message indicates the first synchronization signal block to the network device through a carried random access preamble.

Based on the first aspect or a possible implementation of the first aspect, in another possible implementation of the first aspect, the method further includes: sending, by the network device, sixth information to the terminal device, where the sixth information indicates a correspondence between a plurality of preamble access codes and a plurality of synchronization signal blocks.

Based on the first aspect or a possible implementation of the first aspect, in another possible implementation of the first aspect, performing, by the network device, frequency domain resource allocation on the terminal device according to the first synchronization signal block, includes: performing frequency domain resource allocation and/or band part configuration on the terminal device according to the first synchronization signal block, as well as capability information of the terminal device and/or a current service condition of the network.

In a second aspect, there is provided a wireless communication method, including: sending, by a terminal device, a first message to a network device, where the first message indicates a first synchronization signal block detected by the terminal device; and determining, by the terminal device, frequency domain resource allocation and/or band part configuration performed by the network device on the terminal device according to the first synchronization signal block.

Based on the second aspect, in a possible implementation of the second aspect, determining, by the terminal device, frequency domain resource allocation and/or band part configuration performed by the network device on the terminal device according to the first synchronization signal block, includes: determining, by the terminal device, frequency domain resource allocation and/or band part configuration performed by the network device on the terminal device according to a frequency point occupied by the first synchronization signal block.

Based on the second aspect or a possible implementation of the second aspect, in another possible implementation of the second aspect, determining, by the terminal device, frequency domain resource allocation and/or band part configuration performed by the network device on the terminal device according to a frequency point occupied by the first synchronization signal block, includes: determining a reference point for frequency domain resource allocation and/or band part configuration performed by the network device on the terminal device, according to a frequency point occupied by the first synchronization signal block; and determining, by the terminal device, frequency domain resource allocation and/or band part configuration performed by the network device on the terminal device according to the reference point.

Based on the second aspect or a possible implementation of the second aspect, in another possible implementation of the second aspect, determining a reference point for frequency domain resource allocation and/or band part configuration performed by the network device on the terminal device, according to a frequency point occupied by the first synchronization signal block, includes: determining the frequency point occupied by the first synchronization signal block as the reference point.

Based on the second aspect or a possible implementation of the second aspect, in another possible implementation of the second aspect, a reference point for the network device to perform band part configuration on the terminal device is a first reference point, and a reference point for the network device to perform resource allocation on the terminal device is a second reference point.

Based on the second aspect or a possible implementation of the second aspect, in another possible implementation of the second aspect, the first reference point is a frequency point occupied by the first synchronization signal block.

Based on the second aspect or a possible implementation of the second aspect, in another possible implementation of the second aspect, the second reference point is a frequency point occupied by a synchronization signal block closest to the configured band part.

Based on the second aspect or a possible implementation of the second aspect, in another possible implementation of the second aspect, the first reference point and the second reference point are the same reference point; or the first reference point and the second reference point are different reference points.

Based the second aspect or a possible implementation of the second aspect, in another possible implementation of the second aspect, the method further includes: receiving, by the network device, first information sent by the terminal device. The first information indicates: a size of allocated resources and/or an offset from the reference point, and/or a number of configured band parts and/or an offset from the reference point. The step of determining, by the terminal device, frequency domain resource allocation and/or band part configuration performed by the network device on the terminal device according to the reference point, includes: determining, by the terminal device, frequency domain resource allocation and/or band part configuration performed by the network device on the terminal device according to the first information and the reference point.

Based on the second aspect or a possible implementation of the second aspect, in another possible implementation of the second aspect, the method further includes: determining a reference signal part corresponding to a configured band part according to a third reference point for the network device to send the reference signal and the band part.

Based on the second aspect or a possible implementation of the second aspect, in another possible implementation of the second aspect, the method further includes: receiving, by the terminal device, second information sent by the network device, where the second information indicates the third reference point.

Based on the second aspect or a possible implementation of the second aspect, in another possible implementation of the second aspect, the first message carries an index of the first synchronization signal block.

Based on the second aspect or a possible implementation of the second aspect, in another possible implementation of the second aspect, the first message indicates the first synchronization signal block to the network device through the occupied resource.

Based on the second aspect or a possible implementation of the second aspect, in another possible implementation of the second aspect, the method further includes: receiving, by the terminal device, third information sent by the network device, where the third information indicates a correspondence between resources occupied by the plurality of the first messages and a plurality of synchronization signal blocks. The step of sending, by the terminal device, a first message to the network device, includes: determining a resource for sending the first message according to the correspondence indicated by the third information; and sending the first message on the determined resource.

Based on the second aspect or a possible implementation of the second aspect, in another possible implementation of the second aspect, the first message is a message in a random access procedure.

Based on the second aspect or a possible implementation of the second aspect, in another possible implementation of the second aspect, the first message is a random access request message, and the first message indicates the first synchronization signal block to the network device through a random access preamble carried.

Based on the second aspect or a possible implementation of the second aspect, in another possible implementation of the second aspect, the method further includes: receiving, by the terminal device, fourth information sent by the network device. The fourth information indicates a correspondence between a plurality of preamble access codes and a plurality of synchronization signal blocks.

The step of sending, by the terminal device, the first message to the network device, includes: determining a random access preamble according to the first synchronization signal block and the correspondence indicated by the fourth information; and sending the first message carrying the random access preamble.

In a third aspect, there is provided a wireless communication method, including: sending, by a network device, first information, where the first information indicates a reference point for the network device to perform frequency domain resource allocation and/or band part configuration on the terminal device; and performing, by the network device, frequency domain resource allocation and/or band part configuration on the terminal device according to the reference point.

Accordingly, in the embodiment of the present disclosure, the reference point for performing frequency domain resource allocation and/or bandwidth partial configuration is indicated by the network device to the terminal device, and the reference point can be flexibly configured, instead of adopting a fixed reference point of the system. In addition, it can solve the problem that when the system bandwidth is large, since the central frequency point of the system bandwidth is constantly taken as a reference point, it requires a longer field for indicating the allocated frequency domain resource and/or the configured band part to the terminal device and thus increases signaling overhead. Moreover, the reference point indicated by the network device for frequency domain resource allocation and/or band part configuration may be applicable to a scenario in which a plurality of synchronization signal blocks exist.

Based on the third aspect, in a possible implementation of the third aspect, a reference point for the network device to perform band part configuration on the terminal device is a first reference point, and a reference point for the network device to perform resource allocation on the terminal device is a second reference point.

Based on the third aspect or a possible implementation of the third aspect, in another possible implementation of the third aspect, the first information indicates the first reference point and the second reference point.

Based on the third aspect or a possible implementation of the third aspect, in another possible implementation of the third aspect, the first information indicates a first reference point. The step of performing, by the network device, frequency domain resource allocation and/or band part configuration on the terminal device according to the reference point, includes: performing band part configuration according to the first reference point; determining a second reference point according to the configured band part; and performing frequency domain resource allocation according to the second reference point.

Based on the third aspect or a possible implementation of the third aspect, in another possible implementation of the third aspect, the second reference point is a frequency point occupied by a synchronization signal block closest to the configured band part.

Based on the third aspect or a possible implementation of the third aspect, in another possible implementation of the third aspect, the first reference point and the second reference point are the same reference point; or the first reference point and the second reference point are different reference points.

Based on the third aspect or a possible implementation of the third aspect, in another possible implementation of the third aspect, the method further includes: sending, by the network device, a reference signal to the terminal device according to the third reference point.

Based on the third aspect or a possible implementation of the third aspect, in another possible implementation of the third aspect, the method further includes: sending, by the network device, second information to the terminal device, where the second information indicates a reference point for sending a reference signal to the terminal device.

Based on the third aspect or a possible implementation of the third aspect, in another possible implementation of the third aspect, the second information is carried in a system broadcast message, a random access response message, or a RRC dedicated signaling.

Based on the third aspect or a possible implementation of the third aspect, in another possible implementation of the third aspect, one of the reference points is a frequency point occupied by one of the plurality of synchronization signal blocks.

Based on the third aspect or a possible implementation of the third aspect, in another possible implementation of the third aspect, the first information is carried in a system broadcast message, a random access response message or a RRC dedicated signaling.

Based on the third aspect or a possible implementation of the third aspect, in another possible implementation of the third aspect, performing, by the network device, frequency domain resource allocation and/or band part configuration on the terminal device, includes: performing frequency domain resource allocation and/or band part configuration on the terminal device according to the reference point, as well as capability information of the terminal device and/or a current service condition of the network.

Based on the third aspect or a possible implementation of the third aspect, in another possible implementation of the third aspect, the configured frequency domain resource and/or band part is used to send a paging message to the terminal device.

In a fourth aspect, there is provided a wireless communication method, including: receiving, by a terminal device, first information sent by a network device, where the first information indicates a reference point for the network device to perform frequency domain resource allocation and/or band part configuration on the terminal device; and determining, by the terminal device, a reference point for the network device to perform frequency domain resource allocation and/or band part configuration on the terminal device, according to the reference point.

Based on the fourth aspect, in a possible implementation of the fourth aspect, a reference point for the network device to perform band part configuration on the terminal device is a first reference point, and a reference point for the network device to perform resource allocation on the terminal device is a second reference point.

Based on the fourth aspect or a possible implementation of the fourth aspect, in another possible implementation of the fourth aspect, the first information indicates the first reference point and the second reference point.

Based on the fourth aspect or a possible implementation of the fourth aspect, in another possible implementation of the fourth aspect, the first information indicates the first reference point.

The step of determining, by the terminal device, a reference point for the network device to perform frequency domain resource allocation and/or band part configuration on the terminal device, according to the reference point, includes: determining band part configuration performed by the network device on the terminal device according to the first reference point; determining a second reference point according to the configured band part; and determining a frequency domain resource allocation performed by the network device on the terminal device, according to the second reference point.

Based on the fourth aspect or a possible implementation of the fourth aspect, in another possible implementation of the fourth aspect, the second reference point is a frequency point occupied by a synchronization signal block closest to the configured band part.

Based on the fourth aspect or a possible implementation of the fourth aspect, in another possible implementation of the fourth aspect, the first reference point and the second reference point are the same reference point; or the first reference point and the second reference point are different reference points.

Based on the fourth aspect or a possible implementation of the fourth aspect, in another possible implementation of the fourth aspect, the method further includes: determining, by the network device, a reference signal part corresponding to a configured band part according to a third reference point for the network device to send the reference signal and the band part.

Based on the fourth aspect or a possible implementation of the fourth aspect, in another possible implementation of the fourth aspect, the method further includes: receiving, by the terminal device, second information sent by the network device, where the second information indicates the third reference point.

Based on the fourth aspect or a possible implementation of the fourth aspect, in another possible implementation of the fourth aspect, the second information is carried in a system broadcast message, a random access response message, or a RRC dedicated signaling.

Based on the fourth aspect or a possible implementation of the fourth aspect, in another possible implementation of the fourth aspect, one of the reference points is a frequency point occupied by one of a plurality of synchronization signal blocks.

Based on the fourth aspect or a possible implementation of the fourth aspect, in another possible implementation of the fourth aspect, the first information is carried in a system broadcast message, a random access response message or a RRC dedicated signaling.

Based on the fourth aspect or a possible implementation of the fourth aspect, in another possible implementation of the fourth aspect, the configured frequency domain resource and/or band part is used to send a paging message to the terminal device.

In a fifth aspect, there is provided a wireless communication method, including: sending, by a network device, first information, where the first information indicates a first reference point for the network device to send a reference signal to a first terminal device; sending, by the network device, the reference signal to the first terminal device, according to the first reference point.

Accordingly, in the embodiment of the present application, the network device indicates the reference point for sending the reference signal to the terminal device, and thus configuration of the reference point can be flexibly performed, and the reference point indicated by the network device for sending the reference signal can be applied to the situation of a plurality of synchronization signal blocks.

Further, different terminal devices may use the same reference point for the reference signals, so as to multiplex the same reference signal sent by the network device; or, different terminals may also use different reference points for the reference signals, so as to send different reference signals for different terminals. This method can achieve flexibility in sending a reference signal.

Based on the fifth aspect, in a possible implementation of the fifth aspect, the first information is carried in a system broadcast message, and the first terminal device includes a terminal device in a coverage of the network device.

Based on the fifth aspect or a possible implementation of the fifth aspect, in another possible implementation of the fifth aspect, the first message is carried in a random access response message or a radio resource control RRC dedicated signaling.

Based on the fifth aspect or a possible implementation of the fifth aspect, in another possible implementation of the fifth aspect, the method further includes: sending, by the network device, second information to a second terminal device, where the second information indicates a second reference point for the network device to send a reference signal to a first terminal device; and sending, by the network device, the reference signal to the second terminal device according to the second reference point.

Based on the fifth aspect or a possible implementation of the fifth aspect, in another possible implementation of the fifth aspect, the first reference point is the same as the second reference point; or the first reference point is different from the second reference point.

Based on the fifth aspect or a possible implementation of the fifth aspect, in another possible implementation of the fifth aspect, one of the reference points is a frequency point occupied by one of the plurality of synchronization signal blocks.

In a sixth aspect, there is provided a wireless communication method, including: receiving, by a terminal device, first information sent by a network device, where the first information indicates a reference point for the network device to send a reference signal; and determining, by the terminal device, the reference point for the network device to send the reference signal, according to the first information.

Based on the sixth aspect, in a possible implementation of the sixth aspect, the method further includes: determining, by the terminal device, a reference signal part corresponding to a band part configured for the terminal device according to the reference point, and the band part.

Based on the sixth aspect or a possible implementation of the sixth aspect, in another possible implementation of the sixth aspect, the first information is carried in a system broadcast message, a random access response message or a radio resource control RRC dedicated signaling.

Based on the sixth aspect or a possible implementation of the sixth aspect, in another possible implementation of the sixth aspect, the reference point is a frequency point occupied by one of the plurality of synchronization signal blocks.

In a seventh aspect, there is provided a network device, for performing the methods in the first aspect or any possible implementation thereof, the third aspect or any possible implementation thereof, or in the fifth aspect or any possible implementation thereof. Specifically, the network device includes function modules for performing the methods in the first aspect or any possible implementation thereof, the third aspect or any possible implementation thereof, or in the fifth aspect or any possible implementation thereof.

In an eighth aspect, there is provided a terminal device, for performing the methods in the second aspect or any possible implementation thereof, the fourth aspect or any possible implementation thereof, or in the sixth aspect or any possible implementation thereof. Specifically, the terminal device includes function modules for performing the methods in the second aspect or any possible implementation thereof, the fourth aspect or any possible implementation thereof, or in the sixth aspect or any possible implementation thereof.

In a ninth aspect, there is provided a network device, including a processor, a memory, and a transceiver. The processor, the memory, and the transceiver communicate with each other through an internal connection, transmission control and/or data signals, such that the network device performs the methods in the first aspect or any possible implementation thereof, the third aspect or any possible implementation thereof, or in the fifth aspect or any possible implementation thereof.

In a tenth aspect, there is provided a terminal device, including a processor, a memory, and a transceiver. The processor, the memory, and the transceiver communicate with each other through an internal connection, transmission control and/or data signals, such that the terminal device performs the methods in the second aspect or any possible implementation thereof, the fourth aspect or any possible implementation thereof, or in the sixth aspect or any possible implementation thereof.

In an eleventh aspect, there is provided a computer readable medium for storing a computer program, the computer program comprising instructions for performing the methods of any of the above aspects or any possible implementation thereof.

According to a twelfth aspect, there is provided a computer program product comprising instructions for performing the method of any of the above aspects or any of its possible implementations when the computer runs the instructions of the computer program product. In particular, the computer program product can be run on a terminal device or network device in any of the above aspects.

BRIEF DESCRIPTION OF THE DRAWINGS

FIG. 3 is a schematic diagram of a synchronization signal block distribution according to an embodiment of the present application.

FIG. 4 is a schematic flowchart of a wireless communication method according to an embodiment of the present application.

DETAILED DESCRIPTION

The technical solutions in the embodiments of the present application are described in conjunction with the accompanying drawings of the embodiments of the present application. Apparently, the described embodiments are a part of the embodiments of the present application, and not all of the embodiments. All other embodiments obtained by a person of ordinary skill in the art based on the embodiments of the present application without paying creative effort are all fall within the protective scope of the present application.

The technical solution of the embodiment of the present application can be applied to various communication systems, for example, Global System of Mobile communication ("GSM") system, Code Division Multiple Access ("CDMA") System, Wideband Code Division Multiple Access ("WCDMA") system, General Packet Radio Service ("GPRS"), Long Term Evolution ("LTE") system, LTE Frequency Division Duplex ("FDD") system, LTE Time Division Duplex ("TDD"), Universal Mobile Telecommunication System ("UMTS"), Worldwide Interoperability for Microwave Access ("WiMAX") communication system, or future 5G system (also known as a New Radio (NR)) system.

Figure 1:
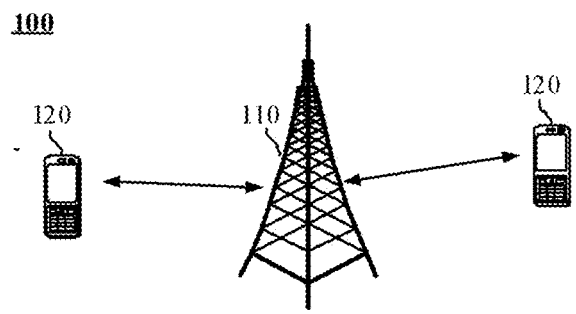
FIG. 1 is a schematic diagram of a communication system according to an embodiment of the present application.

FIG. 1 shows a wireless communication system 100 to which an embodiment of the present application is applied. The wireless communication system 100 may include a network device 110. The network device 100 may be a device in communication with a terminal device. The network device 100 may provide communication coverage for a particular geographic area and may communicate with terminal devices (e.g., UEs) located within the coverage area. Optionally, the network device 100 may be a base station (Base Transceiver Station, BTS) in a GSM system or a CDMA system, or may be a base station (NodeB, NB) in a WCDMA system, or may be an evolved base station (Evolutional Node B, eNB or eNodeB) in an LTE system, or a wireless controller in a Cloud Radio Access Network (CRAN). Alternatively, the network device may be a relay station, an access point, an on-board vehicle device, a wearable device, a network side device in a future 5G network or a network device in a Public Land Mobile Network (PLMN) evolved in the future.

The wireless communication system 100 also includes at least one terminal device 120 located within the coverage of the network device 110. The terminal device 120 may be mobile or fixed. Optionally, the terminal device 120 may refer to an access terminal, a user equipment (User Equipment, UE), a subscriber unit, a subscriber station, a mobile station, a mobile station, a remote station, a remote terminal, a mobile device, a user terminal, a terminal, a wireless communication device, a user agent, or user device. The access terminal may be a cellular phone, a cordless phone, a Session Initiation Protocol (SIP) phone, a Wireless Local Loop (WLL) station, a Personal Digital Assistant (PDA), a handheld device with wireless communication capabilities, a computing device or other processing device connected to a wireless modem, an on-board vehicle device, a wearable device, a terminal device in a future 5G network, or a terminal device in a future evolved PLMN, and so on.

Optionally, device to device (D2D) communication may be performed between the terminal devices 120.

Alternatively, the 5G system or network may also be referred to as a New Radio (NR) system or network.

FIG. 1 exemplarily shows one network device and two terminal devices. Alternatively, the wireless communication system 100 may include a plurality of network devices and may include other number of terminal devices within the coverage of each network device. The application embodiment does not limit this.

Optionally, the wireless communication system 100 may further include other network entities, such as a network controller, a mobility management entity, and the like.

It should be understood that the terms "system" and "network" are used interchangeably herein. The term "and/or" in this context is merely an association describing associated objects, indicating that there may be three relationships. For example, A and/or B may indicate respectively three situations that: A exists separately, both A and B exist, and B exists separately. In addition, the symbol "/" herein generally indicates that the associated objects have an "or" relationship.

In a 5G system, the network device may send a SS burst set including a plurality of Synchronization Signal Blocks to the terminal device, and each SS block includes a Primary Synchronization Signal (PSS), a Secondary Synchronization Signal (SSS), a Physical Broadcasting Channel (PBCH). Moreover, the frequency position of the SS block within the system bandwidth is not limited to the central frequency point position of the system bandwidth. The terminal device searches for the SS block in the system bandwidth to acquire time-frequency synchronization, acquire PBCH information, and perform radio resource management (RRM) measurement.

The 5G system can support a broadband component carrier with a large bandwidth, such as a broadband component carrier with a bandwidth of 400 MHz or even 1 GHz. A plurality of SS blocks may be transmitted in the frequency domain within the broadband member carrier. The future 5G system may support transmission of a plurality of SS blocks in the frequency domain within the broadband component carrier. The terminal may access the system by searching for any one SS block in the plurality of SS blocks.

Based on this, an embodiment of the present application provides a solution for frequency domain resource allocation, band part configuration, and/or reference signal transmission for a terminal device in the case where a plurality of synchronization signal blocks exist on a bandwidth component carrier.

Optionally, in an embodiment of the present application, the system bandwidth may include a plurality of band parts (BP).

Optionally, the bandwidth sizes of the plurality of band parts may be the same or different.

Optionally, when the bandwidth sizes of the plurality of band parts are different, the plurality of band parts may not overlap at all. Alternatively, a small band part falls into a larger band part, and the center frequency point of the small band part and the center frequency point of the large band part may overlap or may not overlap.

Optionally, two adjacent band parts of the plurality of band parts may have no gap and no overlap. Alternatively, two adjacent band parts may partially overlap.

Optionally, in an embodiment of the present application, the frequency domain resources allocated by the frequency domain resource allocation may be a frequency domain resources in the configured band part, and the allocated frequency domain resources may be counted by a frequency domain resource unit, for example, frequency domain resources occupied by a Physical Resource Block (PRB).

Optionally, in an embodiment of the present application, the frequency domain resource allocation may be used for data transmission of the terminal device. The network device may allocate the frequency domain resources according to the data volume to be transmitted by the terminal device.

Optionally, in an embodiment of the present application, the band part configured for the terminal device may be semi-static, and the network device may configure the band part for the terminal device according to the capability of the terminal device.

Optionally, in an embodiment of the present application, the corresponding band part may be configured for the terminal device according to the data volume of the terminal device, for example, a small data volume transmission may configure a smaller band part, a large data volume transmission may configure a larger band part or even full bandwidth Optionally, in an embodiment of the present application, the band part configuration and/or the frequency domain resource allocation performed by the terminal device may refer to the synchronization signal block detected by the terminal device. A detailed description will be made below in conjunction with the method 200 shown in FIG. 2.

Figure 2:
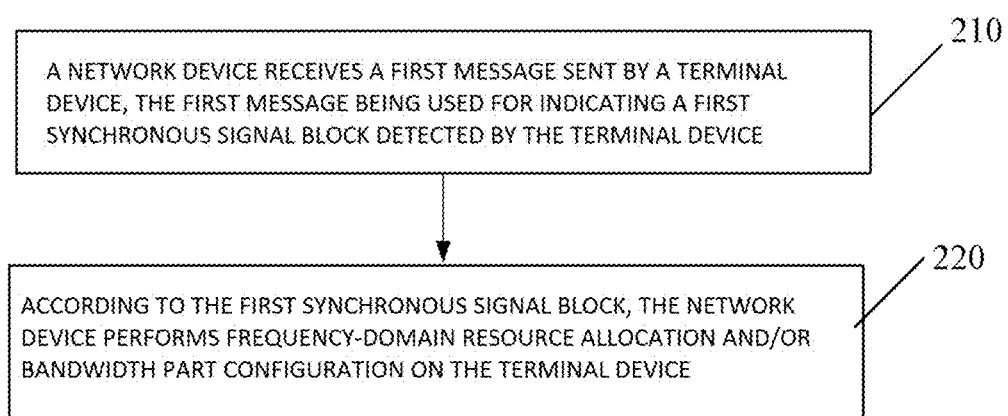
FIG. 2 is a schematic flowchart of a wireless communication method according to an embodiment of the present application.

FIG. 2 is a schematic flowchart of a wireless communication method 200 according to an embodiment of the present application. As shown in FIG. 2, the method 200 includes at least some of the following contents.

In 210, the network device receives a first message sent by the terminal device, where the first message indicates a first synchronization signal block detected by the terminal device.

Optionally, in an embodiment of the present application, the first message may indicate, explicitly or implicitly, the first synchronization signal block detected by the terminal device.

In an implementation, the first message carries an index of the first synchronization signal block.

Specifically, a plurality of SS blocks are configured in the network, and after the terminal device finds one of the SS blocks by searching, the terminal device may acquire the index of the SS block. Then, the terminal device may report the index of the SS block found by the terminal through signaling. The signaling may be a Radio Resource Control (RRC) connection request.

Optionally, the network device may notify the terminal device of index information of the SS block in the frequency in advance through a system message, such as binding with the SS block.

In an implementation, the first message indicates the first synchronization signal block to the network device through the occupied resource.

Specifically, in an embodiment of the present application, the terminal device may determine a resource for sending the first message, according to the detected first synchronization signal block, and indicate the synchronization signal block detected by the terminal device to the network device through the resource for sending the first message. The network device may determine the synchronization signal block detected by the terminal device, according to the resource for sending the first message.

Optionally, in an embodiment of the present application, the terminal device may determine the resource for sending the first message, according to a correspondence between resources occupied by a plurality of first messages and a plurality of synchronization signal blocks. Correspondingly, the network device may determine the synchronization signal block detected by the terminal device, according to the correspondence between the resources occupied by the plurality of first messages and the plurality of synchronization signal blocks, and the resource for receiving the first message.

Optionally, in an embodiment of the present application, the network device may indicate, to the terminal device, a correspondence between the resources occupied by the plurality of the first messages and the plurality of synchronization signal blocks. Optionally, the correspondence may be broadcast to the terminal device through a broadcast message.

Optionally, the first message may be a message in a random access procedure, for example, may be MSG1 or MSG3.

Optionally, in an embodiment of the present application, when the first message is a random access request message, the first message indicates the synchronization signal block detected by the terminal device to the network device through a carried random access preamble.

Specifically, in an embodiment of the present application, the terminal device may determine the random access preamble according to the detected first synchronization signal block, and carry the random access preamble in a random access request message. The network device may determine the synchronization signal block detected by the terminal device according to the random access preamble carried in the random access request message.

Optionally, in an embodiment of the present application, the terminal device may determine, according to the correspondence between the plurality of random access preambles and the plurality of synchronization signal blocks, a random access preamble corresponding to the detected synchronization signal block. Correspondingly, the network device may determine, according to the correspondence between the plurality of random access preambles and the plurality of synchronization signal blocks, and the received random access preamble, the synchronization signal block detected by the terminal device.

Optionally, in an embodiment of the present application, the network device may indicate, to the terminal device, a correspondence between the plurality of random access preambles and the plurality of synchronization signal blocks. Optionally, the correspondence may be broadcast to the terminal device through a broadcast message.

In 220, according to the first synchronization signal block, the network device performs frequency domain resource allocation and/or band part configuration on the terminal device.

Optionally, in an embodiment of the present application, the network device performs frequency domain resource allocation and/or band part configuration on the terminal device according to a frequency point occupied by the first synchronization signal block.

Optionally, the frequency point occupied by the synchronization signal block mentioned in the embodiment of the present application may be a center frequency point, an upper frequency point or a lower frequency point occupied by the synchronization signal block.

Optionally, in an embodiment of the present application, the network device may determine a reference point according to the frequency point occupied by the first synchronization signal block; according to the reference point, the network device performs frequency domain resource allocation and/or band part configuration on the terminal device.

In an implementation, the network device may determine the frequency point occupied by the first synchronization signal block as the reference point.

In an implementation, the network device may determine a second synchronization signal block according to a frequency point occupied by the first synchronization signal block; the network device may determine the reference point according to a frequency point occupied by the second synchronization signal block.

Specifically, the network device may determine the second synchronization signal block when it is found that an interval between the first synchronization signal block and the frequency domain resource to be allocated to the terminal device is greater than or equal to a predetermined value. The network device may determine the reference point according to the frequency point occupied by the second synchronization signal block.

Accordingly, in this implementation, it can be avoided that when the frequency domain resource or the band part are allocated to the terminal device, since a distance between the reference point and the allocated frequency domain resource or the configured band part is too large, too many field are required for indication, the signaling overhead caused is too large.

Optionally, the network device may determine the frequency point occupied by the second synchronization signal block as a reference point for frequency domain resource allocation and/or band part configuration.

Optionally, in an embodiment of the present application, a reference point (which may be referred to as a second reference point) for frequency domain resource allocation and a reference point (which may be referred to as a first reference point) for band part configuration may be the same, or may also be different reference points.

For example, the frequency point occupied by the first synchronization signal block may be directly determined as both of a reference point for frequency domain resource allocation and a reference point for band part configuration.

For example, the network device may determine a frequency point occupied by the first synchronization signal block as a reference point for band part configuration, and determine a reference point for frequency domain resource allocation based on the configured band part. Determining a reference point for frequency domain resource allocation based on the configured band part may be: determining a frequency point occupied by a synchronization signal block closest to the configured band part as a reference point for frequency domain resource allocation, or determining a synchronization signal block from synchronization signal blocks having a frequency domain distance from the configured band part that is less than or equal to a predetermined value, and determining a reference point for frequency domain resource allocation based on the determined synchronization signal block.

For example, the frequency point occupied by the second synchronization signal block may be determined as a reference point for band part configuration, and a reference point for frequency domain resource allocation may be determined based on the configured band part. Determining the reference point for frequency domain resource allocation based on the configured band part may be: determining a frequency point occupied by the synchronization signal block closest to the configured band part as a reference point for frequency domain resource allocation, or, determining a synchronization signal block from synchronization signal blocks having a frequency domain distance from the configured band part that is less than or equal to a predetermined value, and a reference point for frequency domain resource allocation is determined based on the determined synchronization signal block.

For ease of understanding, a detailed description will be made below with reference to FIG. 3 as an example.

For example, as shown in FIG. 3, two synchronization signal blocks (SS blocks, SSB) are distributed in the broadband component carrier. If the network device determines that the SSB detected by the terminal device is SSB1, the network device may use the frequency point where the SSB1 is located as a reference point, configure a band part 0 or a band part 1 for the terminal, and perform traffic scheduling (including frequency domain resource allocation) on the terminal device in the band part 0 or the band part 1.

Alternatively, if the terminal device retrieves a SSB1 and reports the SSB1 to the network device through the foregoing method, but the network device expects to configure a band part 2 for the terminal device. Then, the network device may take the frequency point where the SSB2 is located as a reference point of the terminal device. In this case, the network device may configure the band part 2 for the terminal device and perform service scheduling on the terminal device in the band part 2 based on the frequency point where the SSB1 is located as the reference point.

Through such an operation, on the one hand, it can provide flexible configuration of band part for operation on the terminal and the frequency reference point for flexible resource allocation, and on the other hand, since the network can reduce the frequency distance between the frequency reference point and the actual allocated frequency resource by selecting a frequency reference point, it can effectively reduce the overhead on resource indication signaling in the downlink control channel.

Optionally, in an embodiment of the present application, when determining that the reference point for band part configuration or frequency domain resource allocation is based on the frequency point occupied by the second synchronization signal block, since the synchronization signal block on which the reference point is determined is changed, the reference point for band part configuration or frequency domain resource allocation may be indicated to the terminal device. Indicating the reference point to the terminal device may be directly notifying the frequency point occupied by the reference point to the terminal device, or notifying the terminal device of the second synchronization signal block based on which the reference point is determined. The indication information may be carried in the random access response message (in this case, the first message may be a random access request message), or carried in RRC dedicated signaling (for example, a RRC connection setup response message, and in this case, the first message may be a RRC connection setup request message).

Optionally, the RRC dedicated signaling in the embodiment of the present application includes a RRC connection setup command or a RRC reconfiguration command.

Optionally, in an embodiment of the present application, the network device may send information, where the information indicates a frequency domain relationship between the plurality of synchronization signal blocks, where the plurality of synchronization signal blocks include the first synchronization signal block and the second synchronization signal block.

Based on this, the terminal device may determine the frequency occupied by the second synchronization signal block according to the frequency domain relationship and the frequency occupied by the first synchronization signal block. If the network device notifies the terminal device that the synchronization signal block based on which the reference point is determined is the second synchronization signal block, the terminal device may determine a reference point for the network device to perform frequency domain resource allocation and/or band part configuration on the terminal device based on the same rules as the network device.

Optionally, in an embodiment of the present application, when the terminal device does not change the synchronization signal block that directly determines the reference point, indication information may also be sent to the terminal device, to indicate the reference point for the network device to perform frequency domain resource allocation and/or band part configuration on the terminal device. Notifying the reference point to the terminal device may be directly notifying the frequency point occupied by the reference point to the terminal device, or may be sending a confirmation message to the terminal device that the network device determines the reference point based on the synchronization signal block detected by the terminal device. The indication information may be carried in a random access response message (in this case, the first message may be a random access request message), or carried in RRC dedicated signaling (for example, a RRC connection setup response message, in this case the first message may be RRC Connection Setup Request message).

Optionally, in an embodiment of the present application, the network device sends information to the terminal device, where the information indicates: an allocated resource size and/or an offset from the reference point, and/or, a number of configured band parts and/or an offset from the reference point. Correspondingly, the terminal device may determine, according to the information sent by the network device and the reference point, a frequency domain resource and/or a configured band part allocated by the network device to the terminal device.

The offset of the allocated resource with respect to the reference point may be an offset of the upper frequency point of the allocated resource with respect to the reference point, an offset of the center frequency point of the allocated resource with respect to the reference point, or a lower frequency point of the allocated resource with respect to the reference point.

The offset of the configured band part with respect to the reference point may be an offset of the upper frequency point of the configured band part with respect to the reference point, an offset of the central frequency point of the configured band part with respect to the reference point, or a lower frequency point of the configured band part with respect to the reference point.

Optionally, in an embodiment of the present application, the network device performs frequency domain resource allocation and/or band part configuration on the terminal device according to capability information of the terminal device and/or a current service condition of the network.

For example, the network device may perform frequency domain resource allocation and/or band part configuration on the terminal device, by also considering the capability information of the terminal device, the data volume to be transmitted by the terminal device, and/or the occupancy of each bandwidth and/or resource by other terminal devices (for considering load balancing).

Optionally, in an embodiment of the present application, the network device may send a reference signal to the terminal device based on a third reference point.

Optionally, in an embodiment of the present application, the network device sends a reference signal to one side of the frequency, by taking the third reference point as a starting point.

Alternatively, in an embodiment of the present application, the network device may send a reference signal to both sides of the frequency based on the reference point.

Alternatively, when no reference signal is required to be sent in a frequency range starting from the third reference point, it may be assumed that the reference signal is still sent by taking the third reference point as a starting point, but not to be sent in the frequency range, and the rest part of the reference signal is sent in other frequency ranges.

For example, the frequency position of the third reference point is at 20 MHz, and the complete reference signal sent by the network device has to occupy 20 MHz, and the frequency point allocated for the terminal is in the frequency range of 0-10 MHz. One method is to send a reference signal in the range of 0-20 MHz. The second method is that, since in a specific scenario, no reference sequence is required to be sent in the range of 10 MHz-20 MHz (if there is no data and reference signal are required to be sent within the bandwidth), then, a reference sequence part a (which originally occupies 10 MHz-20 MHz) constituting the reference signal may be no longer sent, and a reference signal part b in the reference signal is sent in the range of 0 MHz-10 MHz, wherein the reference signal part a and the reference signal b form the complete reference signal.

Optionally, in an embodiment of the present application, the terminal device may receive the reference signal within a configured bandwidth range.

Optionally, in an embodiment of the present application, the terminal device may determine the reference signal part corresponding to the band part as a local sequence according to the third reference point of the reference signal sent by the network device and the configured band part, receive the reference signal in the configured bandwidth portion, and perform channel measurement through the local sequence and the received reference signals, to obtain corresponding channel quality Optionally, in an embodiment of the present application, the network device may send information to the terminal device to notify the third reference point.

Optionally, in an embodiment of the present application, the third reference point may be the same reference point as the first reference point and/or the second reference point.

Optionally, in an embodiment of the present application, the third reference point may be notified to the terminal device through a broadcast message. In this case, the terminal devices in the range of the broadcast message may share the same third reference point.

Optionally, in an embodiment of the present application, the third reference point may be notified to the terminal device through a random access response message or a RRC dedicated signaling (a RRC connection setup response message), and in this case, the plurality of terminal devices corresponding to the third reference point may be the same or may be different.

Accordingly, in the embodiment of the present application, the network device can perform frequency domain resource allocation and/or band part configuration on the terminal device referring to the synchronization signal block currently detected by the terminal device, thereby implementing flexible frequency domain resource allocation and/or band part configuration.

It should be understood that, although most of the embodiments in the present application describe a reference point for determining frequency domain resource allocation and/or band part configuration according to a synchronization signal block, the embodiment of the present application is not limited thereto. For example, the network device may determine the working condition of the terminal device according to the synchronization signal block detected by the terminal device, and perform frequency domain resource allocation and/or system bandwidth configuration according to the working condition.

FIG. 4 is a schematic flowchart of a wireless communication method 300 according to an embodiment of the present application. As shown in FIG. 4, the method includes at least part of the following contents.

In 310, the network device sends first information, where the first information indicates a reference point for the network device to perform frequency domain resource allocation and/or band part configuration on the terminal device. Optionally, the first information is carried in a system broadcast message, a random access response message, or a RRC dedicated signaling.

In 320, according to the reference point, the network device performs frequency domain resource allocation and/or band part configuration on the terminal device.

Optionally, in an embodiment of the present application, the reference point for the network device to perform the band part configuration on the terminal device is a first reference point, and the reference point for the network device to perform frequency domain resource allocation on the terminal device is a second reference point.

Optionally, in an embodiment of the present application, the first reference point and the second reference point are the same reference point; or the first reference point and the second reference point are different reference points.

Optionally, in an embodiment of the present application, the first information indicates the first reference point and the second reference point.

Optionally, in an embodiment of the present application, the first information indicates the first reference point; the band part is configured according to the first reference point; and the second reference point is determined according to the configured band part; the frequency domain resource allocation is performed according to the second reference point. The second reference point may be a frequency point occupied by the synchronization signal block closest to the configured band part.

Optionally, in an embodiment of the present application, according to the third reference point, the network device sends a reference signal to the terminal device.

Optionally, in an embodiment of the present application, the network device sends information to the terminal device, where the information indicates the reference point for sending a reference signal to the terminal device. The information is optionally carried in a system broadcast message, a random access response message, or a RRC dedicated signaling.

Optionally, in an embodiment of the present application, one of the reference points is a frequency point occupied by one of the plurality of synchronization signal blocks.

Optionally, in an embodiment of the present application, according to the reference point, combining the capability information of the terminal device and/or the current service condition of the network, frequency domain resource allocation and/or band part configuration are performed on the terminal device.

Optionally, the configured frequency domain resource and/or band part is used to send a paging message to the terminal device.

Optionally, in an embodiment of the present application, the network device may determine a reference point for frequency domain resource allocation and/or band part configuration for the terminal device, according to the type of the terminal device.

Figures 5, 6:
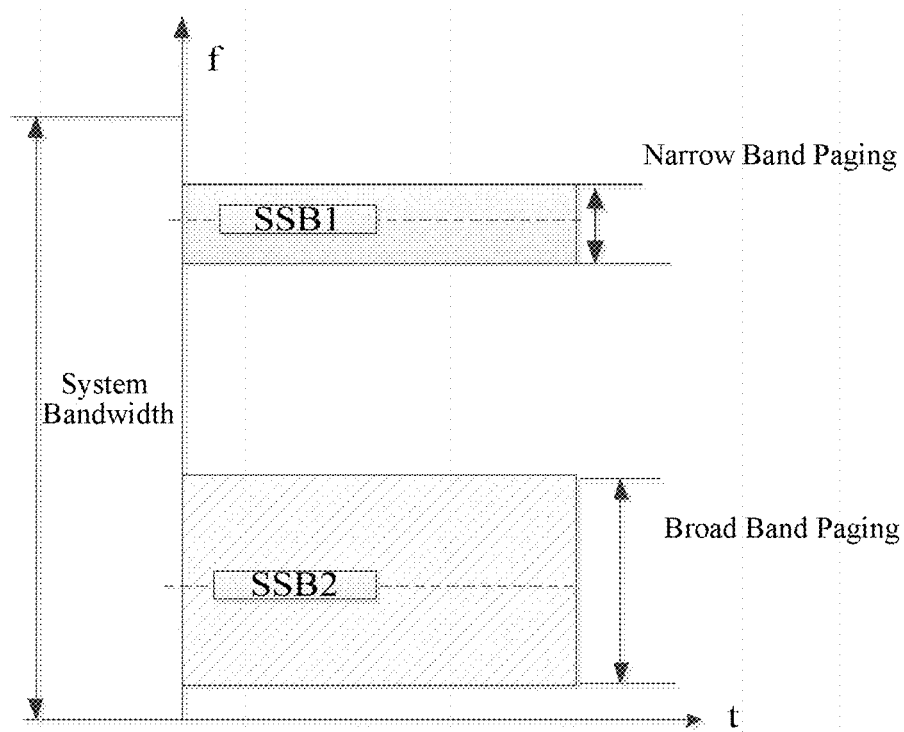
FIG. 5 is a schematic diagram of a synchronization signal block distribution according to an embodiment of the present application.
FIG. 6 is a schematic flowchart of a wireless communication method according to an embodiment of the present application.

For different types of terminals, the network device may select different SSBs as reference points for paging message transmission. For example, as shown in FIG. 5, for a terminal with a bandwidth less than or equal to 20 MHz, the network device may select an SSB with an index of 1 as a reference point for sending a paging message, to send a paging message with a narrow band. For a terminal with a bandwidth greater than 20 MHz, the network device may select an SSB with an index of 2 as a reference point for sending a paging message, to send a paging message with a broad band.

Optionally, in an embodiment of the present application, according to the third reference point, the network device sends a reference signal to the terminal device.

Optionally, the network device sends information to the terminal device, where the information indicates the third reference point for sending the reference signal to the terminal device.

Accordingly, in the embodiment of the present application, the reference point for frequency domain resource allocation and/or band part configuration is indicated by the network device to the terminal device, and the reference point can be flexibly configured, instead of adopting a fixed reference point of the system. In addition, it can solve the problem that when the system bandwidth is large, since the central frequency point of the system bandwidth is constantly taken as a reference point, it requires a longer field for indicating the allocated frequency domain resource and/or the configured band part to the terminal device and thus increases signaling overhead. Moreover, the reference point indicated by the network device for frequency domain resource allocation and/or band part configuration may be applicable to a scenario in which a plurality of synchronization signal blocks exist.

FIG. 6 is a schematic flowchart of a wireless communication method 400 according to an embodiment of the present application. As shown in FIG. 6, the method includes at least some of the following contents.

In 410, the network device sends the first information, where the first information indicates a first reference point for the network device to send a reference signal to a first terminal device.

In 420, the network device sends the reference signal to the first terminal device according to the first reference point.

Optionally, the first information is carried in a system broadcast message, and the first terminal device includes a terminal device in the coverage of the network device.

Optionally, the first message is carried in a random access response message or a radio resource control RRC dedicated signaling.

Optionally, the network device sends second information to a second terminal device, where the second information indicates a second reference point for the network device to send a reference signal to a first terminal device; and the network device sends the reference signal to the second terminal device according to the second reference point.

Optionally, the first reference point is the same as the second reference point. Or alternatively, the first reference point is different from the second reference point.

Optionally, one of the reference points is a frequency point occupied by one of the plurality of synchronization signal blocks.

Accordingly, in the embodiment of the present application, the network device indicates the reference point for sending the reference signal to the terminal device, and thus configuration of the reference point can be flexibly performed, and the reference point indicated by the network device for sending the reference signal can be applied to the situation of a plurality of synchronization signal blocks.

Further, different terminal devices may use the same reference point for the reference signals, so as to multiplex the same reference signal sent by the network device; or, different terminals may also use different reference points for the reference signals, so as to send different reference signals for different terminals. This method can achieve flexibility in sending a reference signal.

Figure 7:
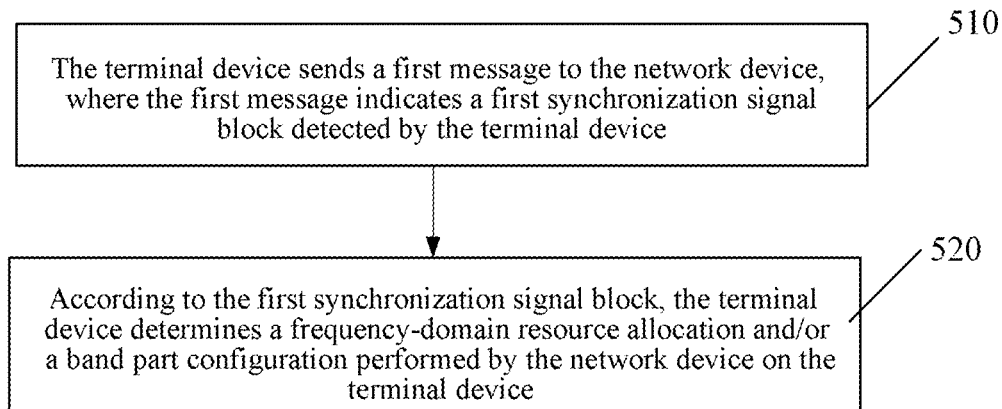
FIG. 7 is a schematic flowchart of a wireless communication method according to an embodiment of the present application.

FIG. 7 is a schematic flowchart of a wireless communication method 500 according to an embodiment of the present application. As shown in FIG. 7, the wireless communication method 500 includes at least some of the following contents.

In 510, the terminal device sends a first message to the network device, where the first message indicates a first synchronization signal block detected by the terminal device.

In 520, according to the first synchronization signal block, the terminal device determines a frequency domain resource allocation and/or a band part configuration performed by the network device on the terminal device.

Optionally, the terminal device determines the frequency domain resource allocation and/or the band part configuration performed by the network device on the terminal device according to a frequency point occupied by the first synchronization signal block.

Optionally, determining a reference point of frequency domain resource allocation and/or band part configuration performed on the terminal device by the network device according to the frequency point occupied by the first synchronization signal block; according to the reference point, the terminal device determines the frequency domain resource allocation and/or the band part configuration performed on the terminal device by the network device.

Optionally, the terminal device determines the frequency point occupied by the first synchronization signal block as the reference point.

Optionally, the reference point for the network device to perform the band part configuration on the terminal device is a first reference point, and the reference point for the network device to perform frequency domain resource allocation on the terminal device is a second reference point.

Optionally, the first reference point is a frequency point occupied by the first synchronization signal block.

Optionally, the second reference point is a frequency point occupied by the synchronization signal block closest to the configured band part.

Optionally, the first reference point and the second reference point are the same reference point; or the first reference point and the second reference point are different reference points.

Optionally, the terminal device receives information sent by the network device, where the information indicates: an allocated resource size and/or an offset from the reference point, and/or a number of the configured band part and/or an offset from the reference point; and according to the information and the reference point, the terminal device determines the frequency domain resource allocation and/or band part configuration performed on the terminal device by the network device.

Optionally, the terminal device may determine the reference signal part corresponding to the band part according to a third reference point for the network device to send the reference signal and the configured band part.

Optionally, the terminal device receives information sent by the network device, where the information indicates the third reference point.

Optionally, the first message carries an index of the first synchronization signal block.

Optionally, the first message indicates the first synchronization signal block to the network device through the occupied resource.

Optionally, the terminal device receives information sent by the network device, where the information indicates a correspondence between resources occupied by the plurality of first messages and a plurality of synchronization signal blocks; and determines the resource for the first message according to the correspondence indicated by the information; and sends the first message on the determined resource.

Optionally, the first message is a message in a random access procedure.

Optionally, the first message is a random access request message, and the first message indicates the first synchronization signal block to the network device through a random access preamble carried.

Optionally, the terminal device receives information sent by the network device, where the information indicates a correspondence between a plurality of preamble access codes and a plurality of synchronization signal blocks; according to the first synchronization signal block and the correspondence indicated by the information, determines the random access preamble; and the terminal device sends the first message carrying the random access preamble.

Figure 8:
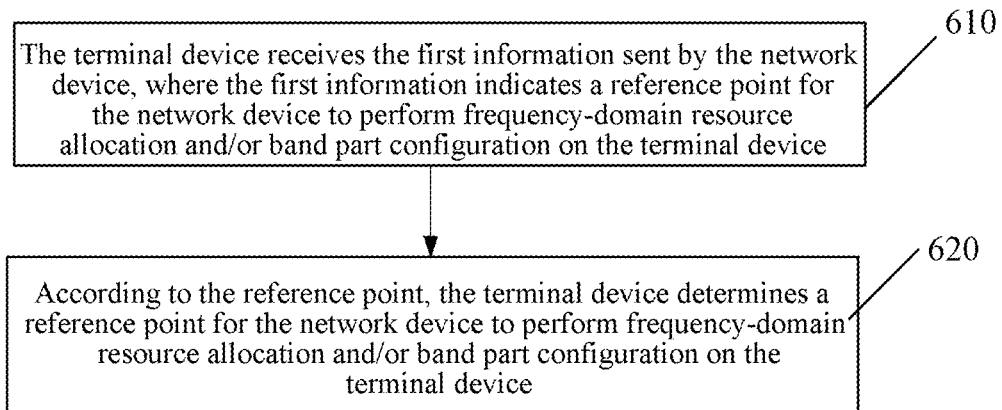
FIG. 8 is a schematic flowchart of a wireless communication method according to an embodiment of the present application.

FIG. 8 is a schematic flowchart of a wireless communication method 600 according to an embodiment of the present application. As shown in FIG. 8, the method 600 includes at least some of the following contents.

In 610, the terminal device receives the first information sent by the network device, where the first information indicates a reference point for the network device to perform frequency domain resource allocation and/or band part configuration on the terminal device. The first information is optionally carried in a system broadcast message, a random access response message, or a RRC dedicated signaling.

In 620, according to the reference point, the terminal device determines a reference point for the network device to perform frequency domain resource allocation and/or band part configuration on the terminal device.

Optionally, the reference point for the network device to perform the band part configuration on the terminal device is a first reference point, and the reference point for the network device to perform the frequency domain resource allocation on the terminal device is a first reference point.

Optionally, the first information indicates the first reference point and the second reference point.

Optionally, the first information indicates the first reference point; according to the first reference point, the terminal device determines a band part configuration performed on the terminal device by the network device; according to the configured band part a second reference point is determined; according to the second reference point, the terminal device determines a frequency domain resource allocation performed on the terminal device by the network device.

Optionally, the second reference point is a frequency point occupied by the synchronization signal block closest to the configured band part.

Optionally, the first reference point and the second reference point are the same reference point. Or alternatively, the first reference point and the second reference point are different reference points.

Optionally, the terminal device determines a reference signal part corresponding to the band part according to the third reference point for the network device to send the reference signal and the configured band part.

Optionally, the terminal device receives information sent by the network device, where the information indicates a third reference point. The information is optionally carried in a system broadcast message, a random access response message, or a RRC dedicated signaling.

Optionally, one of the reference points is a frequency point occupied by one of the plurality of synchronization signal blocks.

Optionally, the configured frequency domain resource and/or band part is used to send a paging message to the terminal device.

Figure 9:
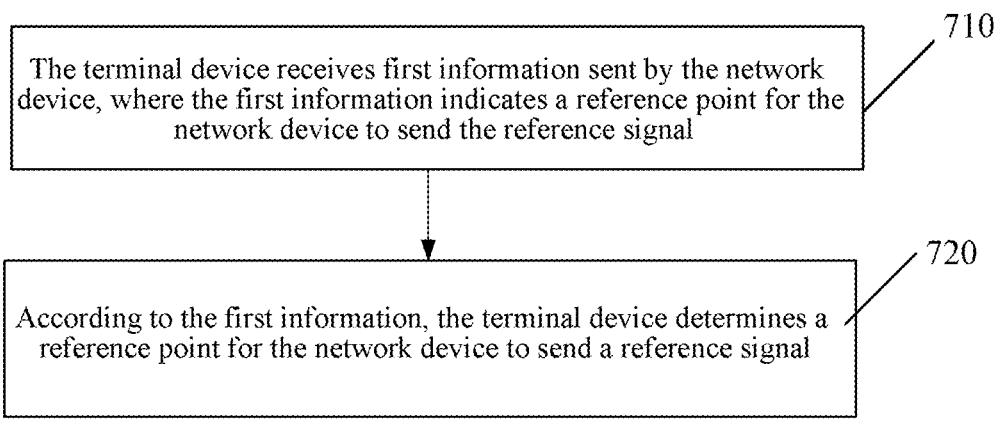
FIG. 9 is a schematic flowchart of a wireless communication method according to an embodiment of the present application.

FIG. 9 is a schematic flowchart of a wireless communication method 700 according to an embodiment of the present application. As shown in FIG. 9, the method 700 includes at least some of the following contents.

In 710, the terminal device receives first information sent by the network device, where the first information indicates a reference point for the network device to send the reference signal.

In 720, according to the first information, the terminal device determines a reference point for the network device to send a reference signal.

Optionally, the terminal device determines a reference signal part corresponding to the band part according to the reference point and a band part configured by the terminal device.

Optionally, the first information is carried in a system broadcast message, a random access response message, or a radio resource control RRC dedicated signaling.

Optionally, the reference point is a frequency point occupied by one of the plurality of synchronization signal blocks.

It should be understood that although the methods 200-700 are separately described above, this does not mean that the methods 200-700 are independent, and the descriptions of the respective methods may be referred to each other. The alternatives of the various methods may be combined without contradiction. The description relating to reference signals, for example, of the method 200, may be applied to methods 300-700. For the sake of brevity, the embodiments of the present application are not described again.

Figure 10:
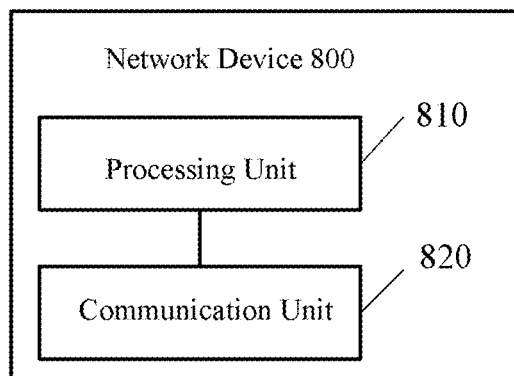
FIG. 10 is a schematic block diagram of a network device according to an embodiment of the present application.

FIG. 10 is a schematic block diagram of a network device 800 according to an embodiment of the present application. As shown in FIG. 10, the network device 800 includes a processing unit 810 and a communication unit 820.

Optionally, the communication unit 820 is configured to: receive a first message sent by the terminal device, where the first message indicates a first synchronization signal block that is detected by the terminal device; and the processing unit 810 is configured to: perform frequency domain resource allocation and/or band part configuration on the terminal device according to the first synchronization signal block.

Optionally, the communication unit 820 is configured to: send first information, where the first information indicates a reference point for the network device to perform frequency domain resource allocation and/or band part configuration on the terminal device; and the processing unit 810 is configured to: perform frequency domain resource allocation and/or band part configuration on the terminal device according to the reference point.

Optionally, the processing unit 810 is configured to: determine a first reference point for the network device to send the reference signal to the first terminal device; the communication unit 820 is configured to: send the first information, where the first information indicates a first reference point for the network device to send a reference signal to the first terminal device; and send the reference signal to the first terminal device according to the first reference point.

It should be understood that the network device 800 may correspond to the network device in the method embodiment, and the functions implemented by the network device in any of the alternative embodiments can be achieved. For brevity, details are not repeated herein.

Figure 11:
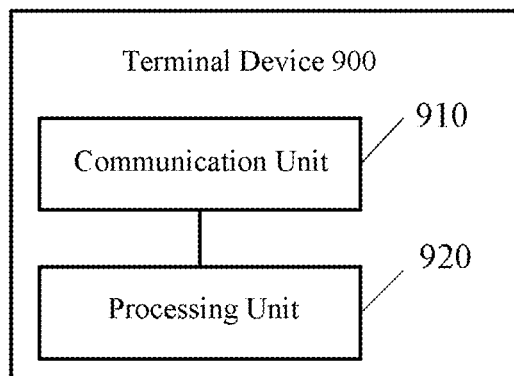
FIG. 11 is a schematic block diagram of a terminal device according to an embodiment of the present application.

FIG. 11 is a schematic block diagram of a terminal device 900 according to an embodiment of the present application. As shown in FIG. 11, the terminal device 900 includes a communication unit 910 and a processing unit 920.

The communication unit 910 is configured to send a first message to the network device, where the first message indicates a first synchronization signal block detected by the terminal device.

The processing unit 920 is configured to determine a frequency domain resource allocation and/or a band part configuration performed on the terminal device by the network device according to the first synchronization signal block.

Optionally, the communication unit 910 is configured to: receive first information sent by the network device, where the first information indicates a reference point for the network device to send a reference signal, and the processing unit 920 is configured to: determine a reference point for the network device to send the reference signal according to the first information.

Optionally, the communication unit 910 is configured to: receive first information sent by the network device, where the first information indicates a reference point for the network device to perform frequency domain resource allocation and/or band part configuration on the terminal device. The processing unit 920 is configured to: determine a reference point for the network device to perform frequency domain resource allocation and/or band part configuration on the terminal device, according to the reference point.

It should be understood that the terminal device 900 may correspond to the terminal device in the method embodiment, and the functions implemented by the terminal device in any of the alternative embodiments can be achieved. For brevity, details are not repeated herein.

Figure 12:
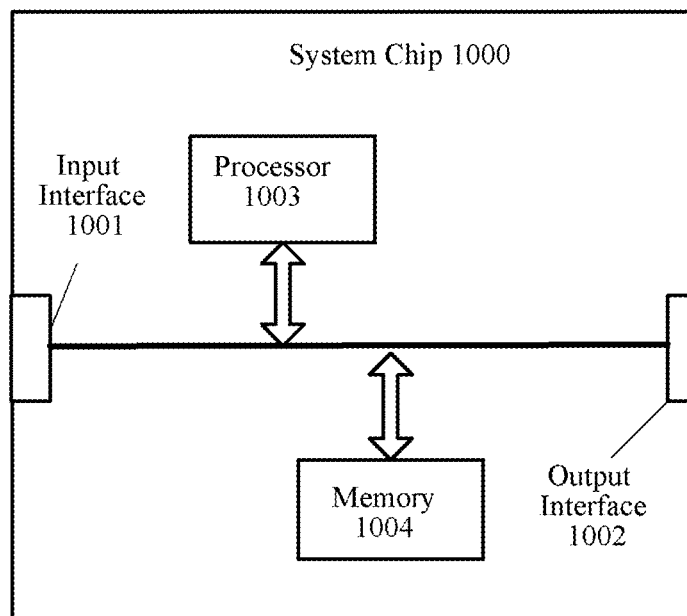
FIG. 12 is a schematic block diagram of a system chip according to an embodiment of the present application.

FIG. 12 is a schematic structural diagram of a system chip 1000 according to an embodiment of the present application. The system chip 1000 of FIG. 12 includes an input interface 1001, an output interface 1002, a processor 1003, and a memory 1004 that may be connected by an internal communication connection line. The processor 1003 is configured to execute codes in the memory 604.

Optionally, when the codes are executed, the processor 1003 implements a method performed by a network device according to the method embodiment. For brevity, details are not repeated herein.

Optionally, when the codes are executed, the processor 1003 implements a method performed by a terminal device according to the method embodiment. For brevity, details are not repeated herein.

Figure 13:
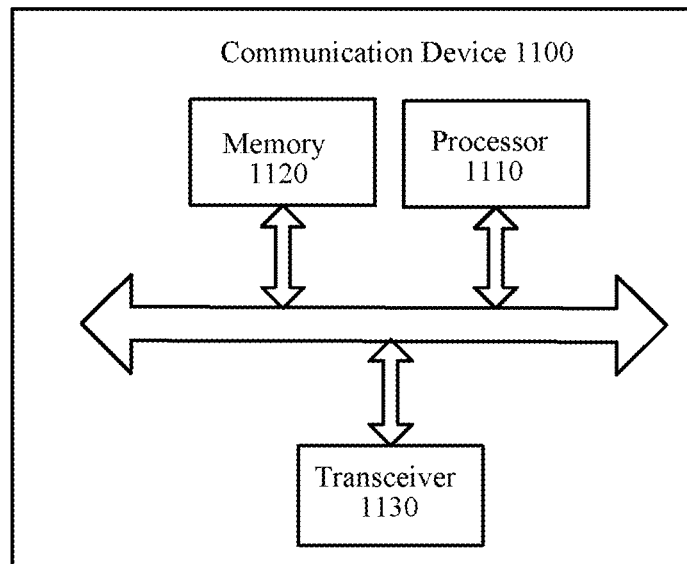
FIG. 13 is a schematic block diagram of a communication device according to an embodiment of the present application.

FIG. 13 is a schematic block diagram of a communication device 1100 according to an embodiment of the present application. As shown in FIG. 13, the communication device 1100 includes a processor 1110 and a memory 1120. The memory 1120 may store program codes, and the processor 1110 may execute the program codes stored in the memory 1120.

Alternatively, as shown in FIG. 13, the communication device 1100 may include a transceiver 1130 which may be controlled by the processor 1110 to perform communication to outside.

Optionally, the processor 1110 may invoke the program codes stored in the memory 1120 to perform the corresponding operations of the primary service node according to the method embodiment. For brevity, details are not repeated herein.

Optionally, the processor 1110 may invoke the program codes stored in the memory 1120 to perform the corresponding operations of the terminal device according to the method embodiment. For brevity, details are not repeated herein.

It should be understood that the processor of the embodiments of the present application may be an integrated circuit chip with signal processing capability. In the implementation process, each step of the foregoing method embodiments may be completed by an integrated logic circuit of hardware in a processor or instructions in a form of software. The processor may be a general-purpose processor, a digital signal processor (DSP), an application specific integrated circuit (ASIC), a Field Programmable Gate Array (FPGA), or other programmable logic devices, discrete gates or transistor logic devices and discrete hardware components. The methods, steps, and logical block diagrams disclosed in the embodiments of the present application may be implemented or executed. The general purpose processor may be a microprocessor or the processor or any conventional processor or the like. The steps of the method disclosed in the embodiments of the present application may be directly implemented by the hardware decoding processor, or may be performed by a combination of hardware and software modules in the decoding processor. The software module may be located in a conventional storage medium such as a random access memory, a flash memory, a read only memory, a programmable read only memory or an electrically erasable programmable memory, a register, and the like. The storage medium is located in the memory, and the processor reads the information in the memory and completes the steps of the above method in combination with the hardware.

It is to be understood that the memory in the embodiments of the present application may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electrically EPROM (EEPROM) or a flash memory. The volatile memory may be a Random Access Memory (RAM) that acts as an external cache. By way of example and not limitation, many forms of RAM are available, such as a static random access memory (static RAM, SRAM), a dynamic random access memory (Dynamic RAM, DRAM), a synchronous dynamic random access memory (Synchronous DRAM, SDRAM), Double data rate synchronous dynamic random access memory (Double Data Rate SDRAM, DDR SDRAM), Enhanced Synchronous Dynamic Random Access Memory (ESDRAM), Synchronous connection of dynamic random access memory (Synchlink DRAM, SLDRAM)) and direct memory bus random access memory (Direct Rambus RAM, DR RAM). It should be noted that the memories of the systems and methods described herein are intended to include, but not limited to, these and any other suitable types of memory.

An embodiment of the present application further provides a computer program product including instructions, when the computer runs the instructions of the computer program product, the computer executes the method for configuring bandwidth according to the foregoing method embodiment. Specifically, the computer program product may run on the network device and the terminal device.

Those of ordinary skill in the art will appreciate that the elements and algorithm steps of the various examples described in connection with the embodiments disclosed herein may be implemented in electronic hardware or a combination of computer software and electronic hardware. Whether these functions are performed in hardware or software depends on the specific application and design constraints of the solution. A person skilled in the art may use different methods to implement the described functions for each particular application, but such implementation should not be considered to be beyond the scope of the present application.

A person skilled in the art may clearly understand that for the convenience and brevity of the description, the specific working process of the system, the device and the unit described above may refer to the corresponding process in the foregoing method embodiment, and details are not repeated herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be another division manner, for example, a plurality of units or components may be combined or may be integrated into another system, or some features may be ignored or not executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may be located in one place, or may be distributed to a plurality of network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present application, is essential or a part contributing to the prior art or a part of the technical solution, may be embodied in the form of a software product, which is stored in a storage medium, including instructions used to cause a computer device (which may be a personal computer, a server, or network device, etc.) to perform all or part of the steps of the methods described in various embodiments of the present application. The foregoing storage medium includes: a U disk, a mobile hard disk, a read-only memory (ROM), a random access memory (RAM), a magnetic disk, or an optical disk, and the like, which may store program codes.

The foregoing are only specific embodiments of the present application, but the protection scope of the present application is not limited thereto, and changes or substitutions readily contemplated by any person skilled in the art within the technical scope disclosed in the present application should be covered by the protection scope of this application. Therefore, the protection scope of the present application should be determined by the scope of the claims.

What is claimed is:

1. A wireless communication method used in a 5G system, comprising:
   performing, by a network device, frequency domain resource allocation and/or bandwidth part configuration for a terminal device according to a reference point, wherein the reference point is used for performing frequency domain resource allocation and/or bandwidth part configuration for the terminal device;
   wherein the reference point comprises a first reference point and a second reference point, the first reference point is used for performing the bandwidth part configuration for the terminal device, and the second reference point is used for performing the frequency domain resource allocation within the bandwidth part for the terminal device;
   wherein the bandwidth part is configured according to the first reference point;
   wherein the second reference point is determined according to the configured bandwidth part; and
   wherein the frequency domain resource within the bandwidth part is allocated according to the second reference point.

2. The method of claim 1, further comprising:
   sending, by the network device, first information to the terminal device, wherein the first information indicates the first reference point.

3. The method of claim 2, wherein the first information is carried in a system broadcast message, or a Radio Resource Control (RRC) dedicated signaling.

4. The method of claim 1, further comprising:
   sending, by the network device, a first part of a complete reference signal that is within a bandwidth range allocated for the terminal device, wherein the complete reference signal is determined according to the reference point, wherein a second part of the complete reference signal is outside the bandwidth range allocated for the terminal device.

5. The method of claim 1, wherein performing, by the network device, frequency domain resource allocation and/or bandwidth part configuration for the terminal device according to the reference point comprises:
   sending, by the network device, third information to the terminal device, where the third information indicates:
      an offset between the bandwidth part configured for the terminal device and the reference point.

6. The method of claim 5, wherein the offset between the bandwidth part and the reference point is an offset between a lowest frequency point of the bandwidth part and the reference point.

7. The method of claim 1, wherein the first reference point is different from the second reference point.

8. A wireless communication method used in a 5G system, comprising:
   determining, by a terminal device, a reference point for a network device to perform frequency domain resource allocation and/or bandwidth part configuration for the terminal device, according to the reference point;
   wherein the reference point comprises a first reference point and a second reference point, the first reference point is used for performing the bandwidth part configuration for the terminal device, and the second reference point is used for performing the frequency domain resource allocation within the bandwidth part for the terminal device;
   wherein the determining, by the terminal device, the reference point for the network device to perform frequency domain resource allocation and/or bandwidth part configuration for the terminal device, according to the reference point, comprises:
      determining bandwidth part configuration performed for the terminal device by the network device according to the first reference point;
      determining the second reference point according to the configured bandwidth part; and
      determining the frequency domain resource allocation within the bandwidth part performed for the terminal device by the network device, according to the second reference point.

9. The method of claim 8, further comprising:
   receiving, by the terminal device, first information sent by the network device, wherein the first information indicates the first reference point.

10. The method of claim 9, wherein the first information is carried in a system broadcast message, or a Radio Resource Control (RRC) dedicated signaling.

11. The method of claim 8, further comprising:
   receiving, by the terminal device, a first part of a complete reference signal that is within a bandwidth range allocated for the terminal device, wherein the complete reference signal is determined according to the reference point, wherein a second part of the complete reference signal is outside the bandwidth range allocated for the terminal device.

12. The method of claim 8, further comprising:
   receiving, by the terminal device, third information sent by the network device, where the third information indicates:
      an offset between the bandwidth part configured for the terminal device and the reference point.

13. The method of claim 12, wherein the offset between the bandwidth part and the reference point is an offset between a lowest frequency point of the bandwidth part and the reference point.

14. The method of claim 8, wherein the first reference point is different from the second reference point.

15. A network device used in a 5G system, comprising:
a processor;
a memory; and
a transceiver,
wherein the processor, the memory and the transceiver communicate with each other through an internal connection, transmission control and/or data signals, such that the network device performs:
performing frequency domain resource allocation and/or bandwidth part configuration for a terminal device according to a reference point, where the reference point is used for performing frequency domain resource allocation and/or bandwidth part configuration for the terminal device;
wherein the reference point comprises a first reference point and a second reference point, the first reference point is used for performing the bandwidth part configuration for the terminal device, and the second reference point is used for performing the frequency domain resource allocation within the bandwidth part for the terminal device;
wherein the bandwidth part is configured according to the first reference point;
wherein the second reference point is determined according to the configured bandwidth part; and
wherein the frequency domain resource within the bandwidth part is allocated according to the second reference point.

16. The network device of claim 15, wherein the network device further performs:
sending first information to the terminal device, wherein the first information indicates the first reference point.

17. The network device of claim 15, wherein the network device further performs:
sending a first part of a complete reference signal that is within a bandwidth range allocated for the terminal device, wherein the complete reference signal is determined according to the reference point, wherein a second part of the complete reference signal is outside the bandwidth range allocated for the terminal device.

18. The network device of claim 15, wherein the network device further performs:
sending third information to the terminal device, where the third information indicates:
an offset between the bandwidth part configured for the terminal device and the reference point, and
wherein the offset between the bandwidth part and the reference point is an offset between a lowest frequency point of the bandwidth part and the reference point.

19. The network device of claim 15, wherein the first reference point is different from the second reference point.

20. A terminal device used in a 5G system, comprising:
a processor;
a memory; and
a transceiver,
wherein the processor, the memory and the transceiver communicate with each other through an internal connection, transmission control and/or data signals, such that the terminal device performs:
determining a reference point for a network device to perform frequency domain resource allocation and/or bandwidth part configuration for the terminal device, according to the reference point;
wherein the reference point comprises a first reference point and a second reference point, the first reference point is used for performing the bandwidth part configuration for the terminal device, and the second reference point is used for performing the frequency domain resource allocation within the bandwidth part for the terminal device;
wherein the determining the reference point for the network device to perform frequency domain resource allocation and/or bandwidth part configuration for the terminal device, according to the reference point, comprises:
determining bandwidth part configuration performed for the terminal device by the network device according to the first reference point;
determining the second reference point according to the configured bandwidth part; and
determining the frequency domain resource allocation within the bandwidth part performed for the terminal device by the network device, according to the second reference point.

21. The terminal device of claim 20, wherein the terminal device further performs:
receiving, first information sent by the network device, wherein the first information indicates the first reference point.

22. The terminal device of claim 20, wherein the terminal device further performs:
receiving, by the terminal device, a first part of a complete reference signal that is within a bandwidth range allocated for the terminal device, wherein the complete reference signal is determined according to the reference point, wherein a second part of the complete reference signal is outside the bandwidth range allocated for the terminal device.

23. The terminal device of claim 20, wherein the terminal device further performs:
receiving third information sent by the network device, where the third information indicates:
an offset between the bandwidth part configured for the terminal device and the reference point, and
wherein the offset between the bandwidth part with respect to the reference point is an offset between a lowest frequency point of the bandwidth part and the reference point.

24. The terminal device of claim 20, wherein the first reference point is different from the second reference point.

* * * * *